United States Patent
Hsu (10) Patent No.: US 10,027,363 B2
(45) Date of Patent: Jul. 17, 2018

(54) BIODEGRADABLE PROTECTIVE DEVICE

(71) Applicant: XIGMA STYLE CORP., New Taipei (TW)

(72) Inventor: Fu-Yi Hsu, Taitung County (TW)

(73) Assignee: XIGMA STYLE CORP., New Taipei (TW)

( * ) Notice: Subject to any disclaimer, the term of this patent is extended or adjusted under 35 U.S.C. 154(b) by 0 days.

(21) Appl. No.: 15/479,827

(22) Filed: Apr. 5, 2017

(65) Prior Publication Data

US 2017/0302323 A1 Oct. 19, 2017

(30) Foreign Application Priority Data

Apr. 18, 2016 (TW) .............................. 105205381 U (51) Int. Cl.
*H04B 1/3888* (2015.01)
*G06F 1/16* (2006.01)

(52) U.S. Cl.
CPC ......... *H04B 1/3888* (2013.01); *G06F 1/1626* (2013.01)

(58) Field of Classification Search
None
See application file for complete search history.

(56) References Cited

U.S. PATENT DOCUMENTS

2012/0036733 A1* 2/2012 Dehn ................ A61F 13/00008
34/282

FOREIGN PATENT DOCUMENTS

TW          201515957 A     5/2015
WO    WO-2015054685 A1 *  4/2015  ................ C08L 7/00

OTHER PUBLICATIONS

Chauhan et al, Biodegradable Plastic, J Textile Sci Eng, 2013, vol. 3, issue 1, p. 1 (Year: 2013).*

* cited by examiner

*Primary Examiner* — Callie Shosho
*Assistant Examiner* — Patrick N English
(74) *Attorney, Agent, or Firm* — Li & Cai Intellectual Property (USA) Office (57) ABSTRACT

A biodegradable protective device adapted for a mobile device includes a main body and a protective portion. The main body is made of biodegradable plastic. The protective portion is made of biodegradable material, and the protective portion is connected to the main body and used to protect the mobile device from damage.

13 Claims, 8 Drawing Sheets

BIODEGRADABLE PROTECTIVE DEVICE

BACKGROUND OF THE INVENTION

1. Field of the Invention

The present invention relates to a protective device; in particular, to a biodegradable protective device.

2. Description of Related Art

With the advancement of science and technology, mobile devices (i.e., mobile phones) continue to be mass-produced and used, and almost any type of mobile devices are additionally equipped with protective devices in order to provide appropriate protection to prevent damage.

However, when a large number of mobile devices are in need of replacement, a large number of protective devices will also be abandoned. These protective devices are mostly made from petroleum-based plastic, such as PP, PU, EVA, artificial fiber, artificial leather etc., and although they have the advantage of low cost in application, they also cause an immeasurable degree of impact and pollution to the environment.

In this regard, the applicant of the present invention provides a solution to address the aforementioned drawback.

SUMMARY OF THE INVENTION

An object of the present invention is to provide a biodegradable protective device that is adapted for a mobile device and that can be biodegraded without causing environmental pollution and impact after being disposed.

In one aspect/configuration of a biodegradable protective device according to the present disclosure, the biodegradable protective device adapted for a mobile device includes a main body and a protective portion. The main body is made of biodegradable plastic. The protective portion is made of biodegradable material, and the protective portion is connected to the main body and used to protect the mobile device from damage.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 4:
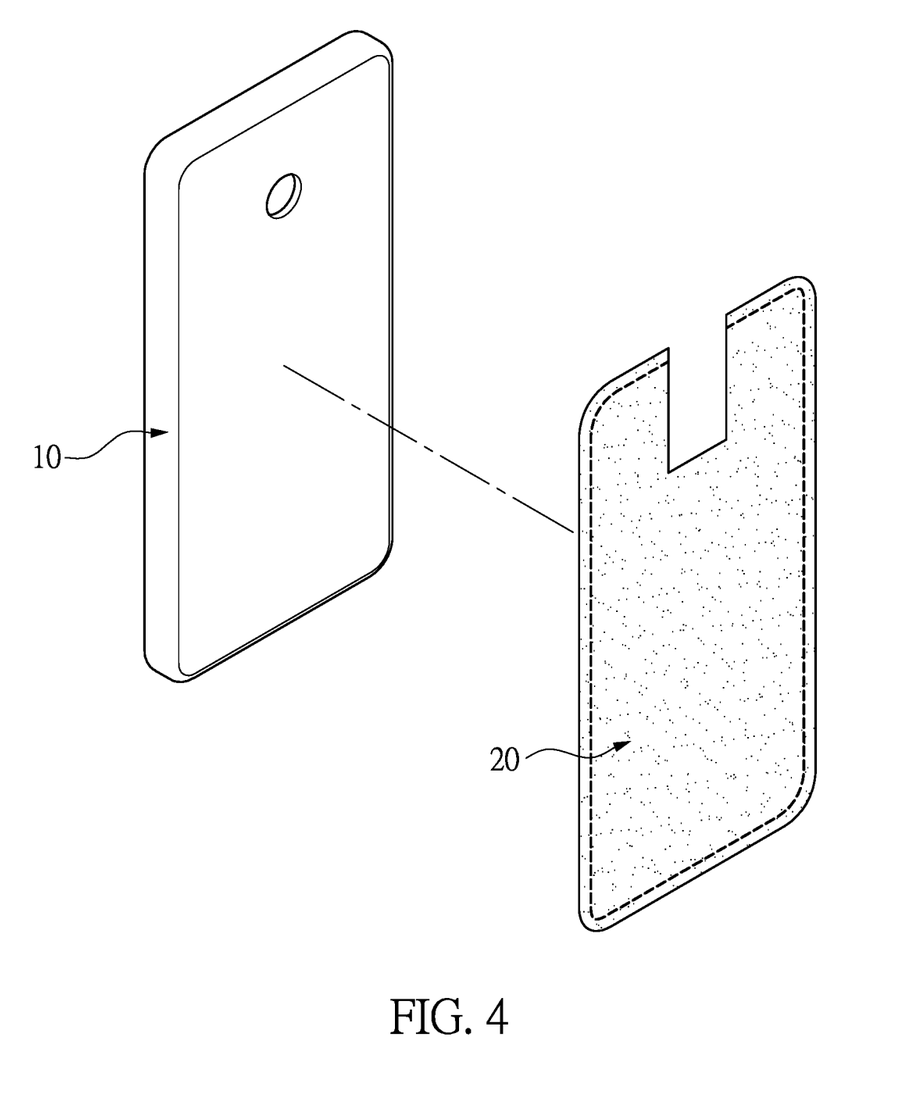
FIG. 4 is a perspective view (4) of the biodegradable protective device according to the present invention.
Figure 5:
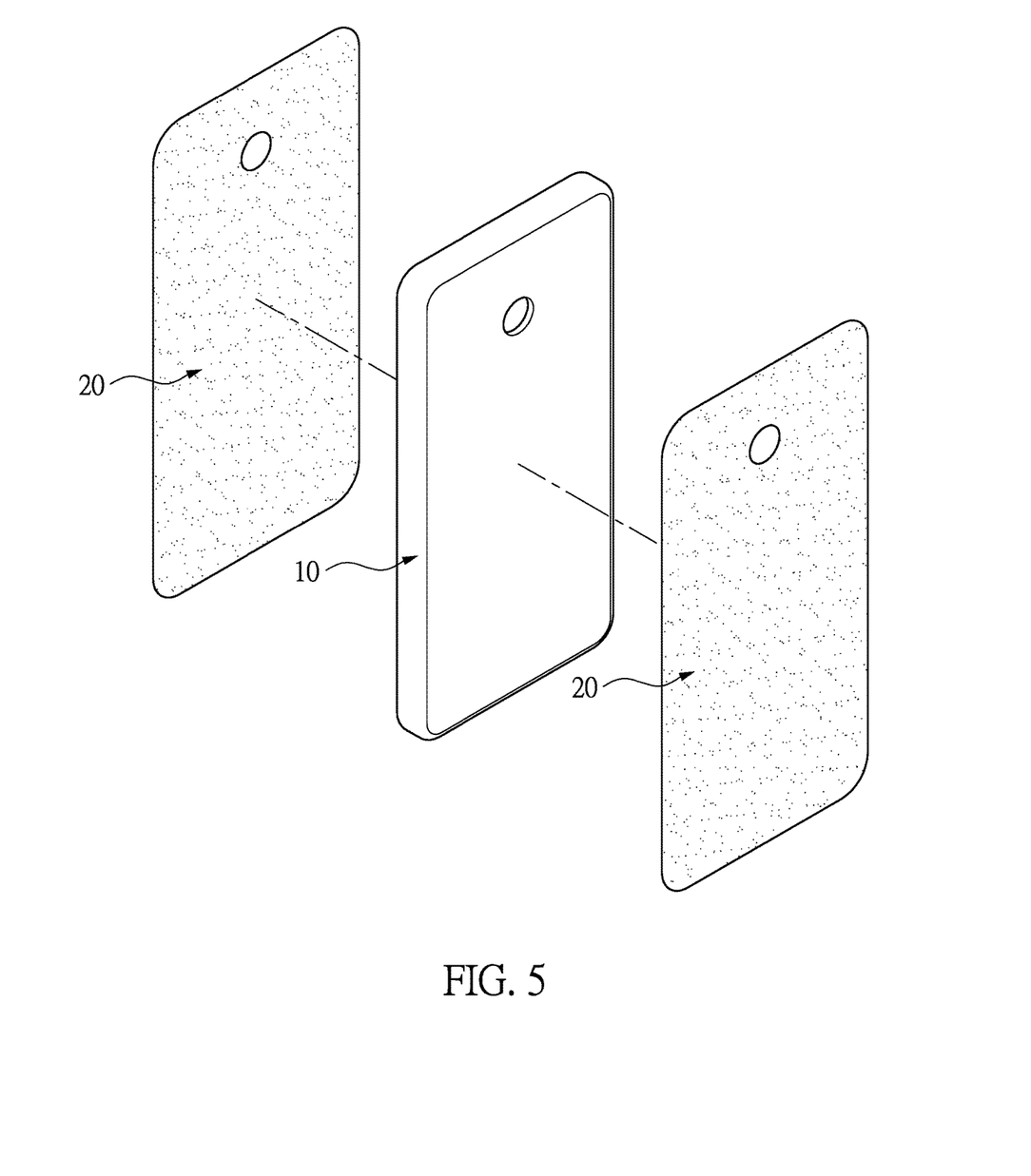
FIG. 5 is a perspective view (5) of the biodegradable protective device according to the present invention.
Figure 6:
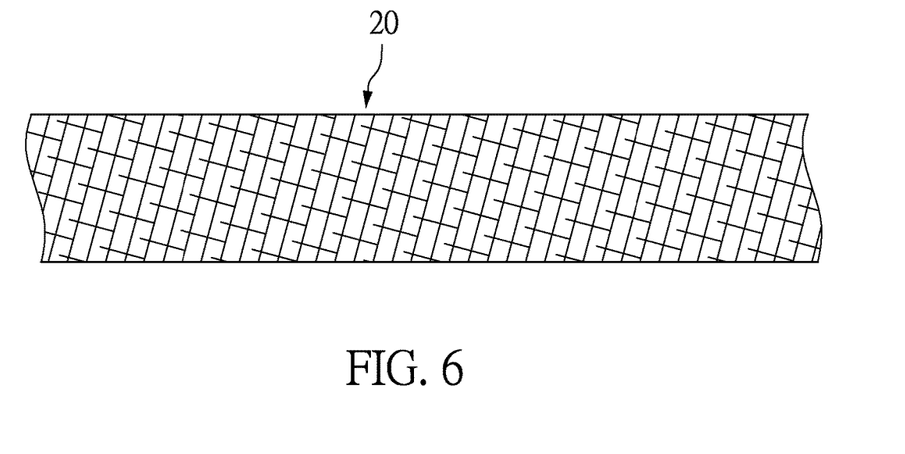
FIG. 6 is a schematic plan view (1) of the protective portion of the biodegradable protective device according to the present invention.
Figure 7:
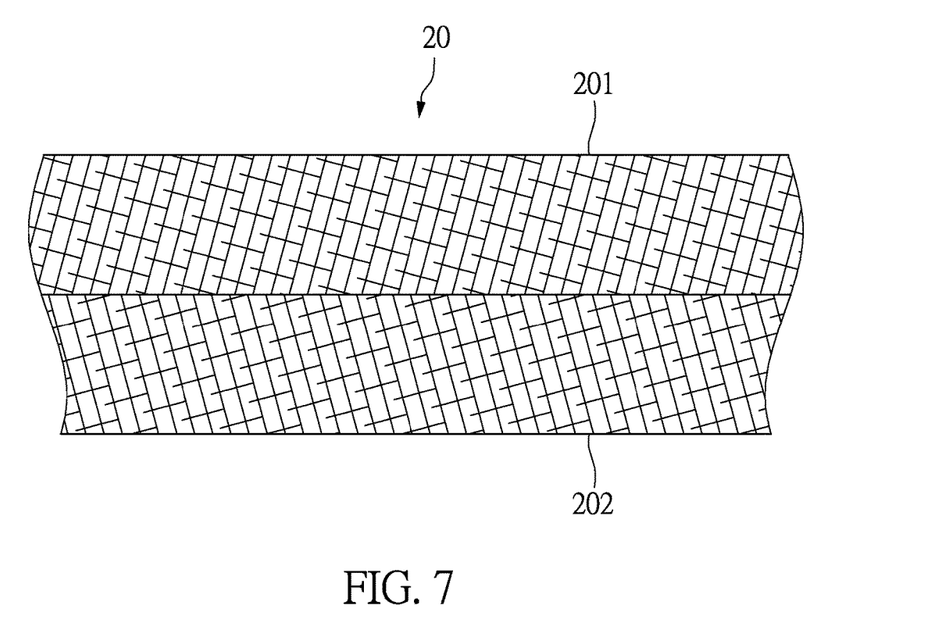
FIG. 7 is a schematic plan view (2) of the protective portion of the biodegradable protective device according to the present invention.
Figure 8:
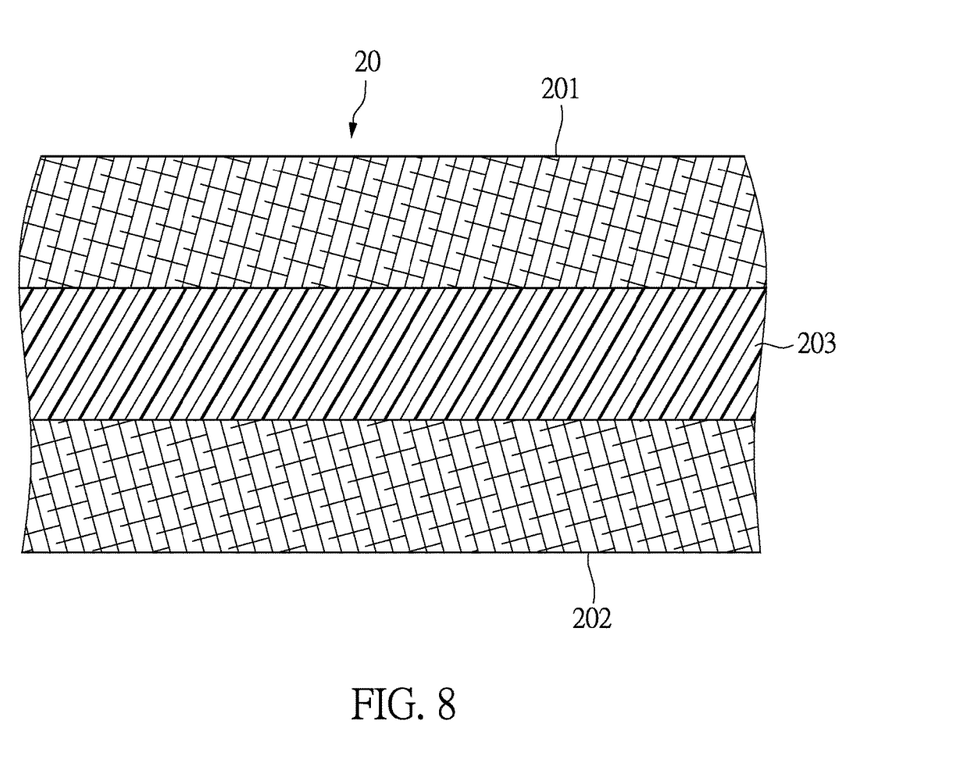
FIG. 8 is a schematic plan view (3) of the protective portion of the biodegradable protective device according to the present invention.

Referring to FIGS. 1 to 8, in which FIGS. 1-5 illustrate five embodiments of the present invention, and FIGS. 6-8 respectively illustrate three different configurations of the protective portion of the present invention.

Figure 1:
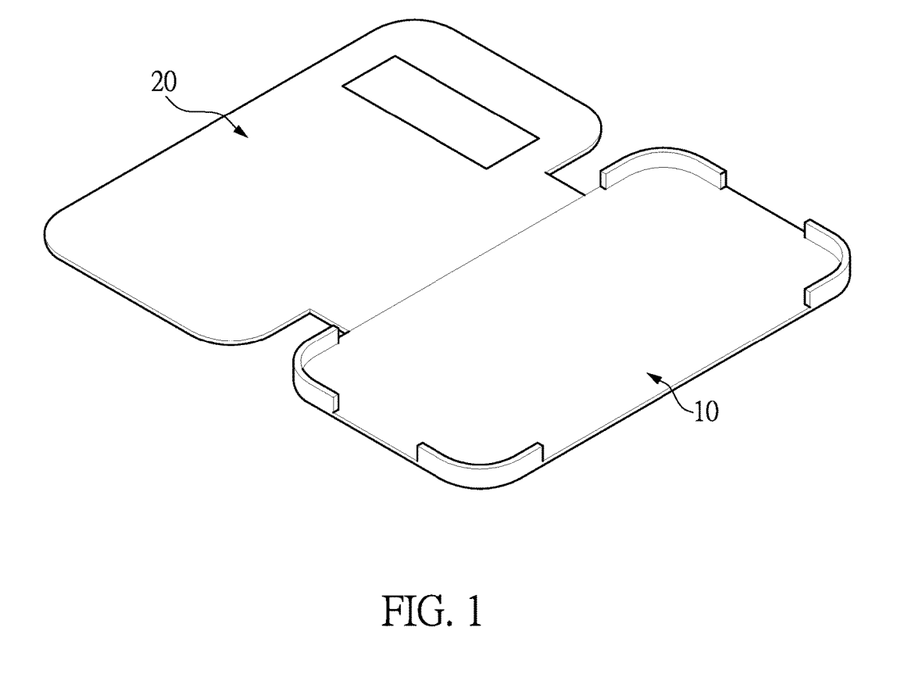
FIG. 1 is a perspective view (1) of the biodegradable protective device according to the present invention.

In the embodiment shown in FIG. 1, a biodegradable protective device that can be adapted for a mobile device, such as a mobile phone, is shown. The biodegradable protective device includes a main body 10 and a protective portion 20.

The main body 10 used to receive a mobile device is made of biodegradable plastic, so that the main body 10 has no conventional plastic materials contained therein and can be degraded almost totally in a natural way by microorganisms such as bacteria, fungi, algae, etc. More specifically, the biodegradable plastic of the present invention consists of PLA (polylactic acid).

The protective portion 20 is used to protect a mobile device from damage and is made of biodegradable material and is connected to the main body 10. In this embodiment, the protective portion 20 is movably connected with the main body 10. That is, the protective portion 20 can be folded back and forth relative to the main body 10 for covering and uncovering a display screen of a mobile device received in the main body 10.

In particular, as shown in FIG. 6, the protective portion 20 is a one-piece structure and can be made of animal leather which is readily biodegradable. In addition, the protective portion 20 can also be made of vegetable/fruit leather which is formed by crystallizing natural plants, such as resin from rubber trees and pulp from apples. Moreover, the protective portion 20 can also be made of bamboo or wood veneer.

In another embodiment of the present invention as illustrated in FIG. 7, the protective portion 20 is a multi-layered composite structure that has a fabric layer 201, and an inner layer 202 on which the fabric layer 201 is stacked. The fabric and inner layers 201, 202 can both be made of leather, such as vegetable/fruit leather. In addition, the fabric layer 201 can also be made of animal leather, and the inner layers 202 can be made of biodegradable fiber. In detail, the fabric and inner layers 201, 202 can be joined together by stitches or adhesive.

In another embodiment of the present invention as illustrated in FIG. 8, the protective portion 20 is a multi-layered composite structure that has a fabric layer 201, a support layer 203 and an inner layer 202 stacked in sequence. The fabric and inner layers 201, 202 can both be made of leather. In addition, the fabric layer 201 can be made of animal or vegetable/fruit leather, and the inner layer 202 can be made of biodegradable fiber. In detail, the support layer 203 is provided between the fabric layer 201 and the inner layer 202, and the support layer 203 can be made of biodegradable plastic, such as polylactic acid or modified polylactic acid material, in order to enhance the overall strength of the protective portion 20.

Figure 2:
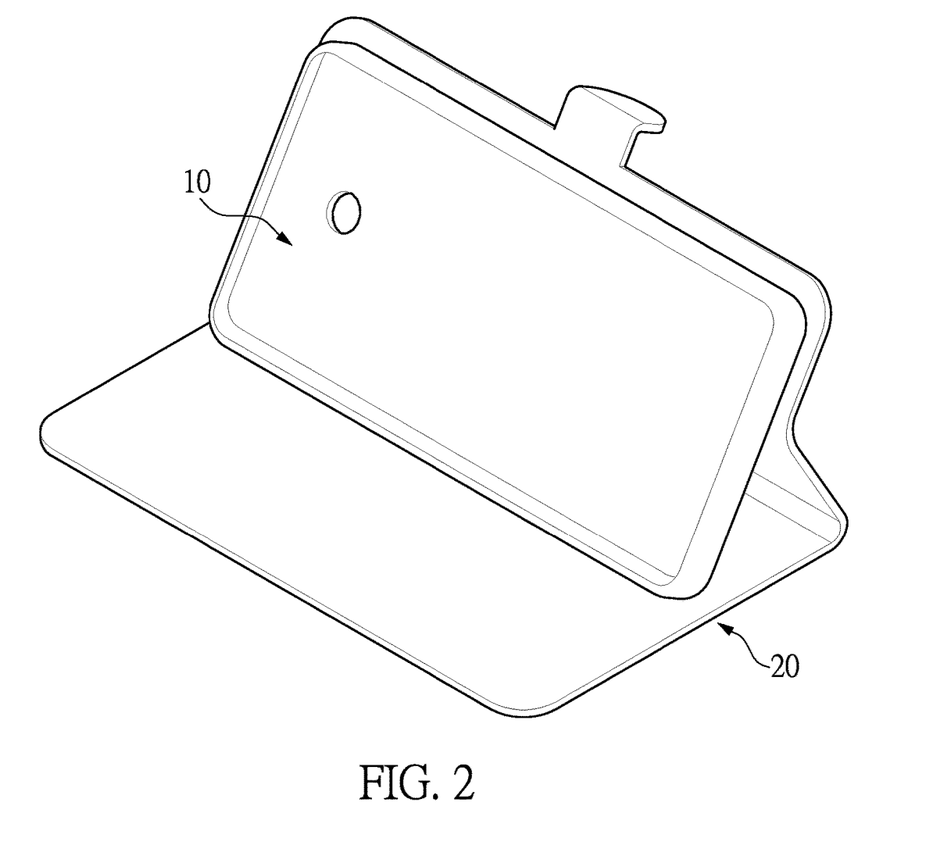
FIG. 2 is a perspective view (2) of the biodegradable protective device according to the present invention.

In an embodiment of the present invention illustrated in FIG. 2, the biodegradable protective device can be adapted for a mobile phone and its protective portion 20 can be either be folded to form a supporting structure or can cover the display screen of the mobile phone (not shown). The detailed structure of the protective portion 20 can be arranged in the manner as shown in FIG. 6.

Figure 3:
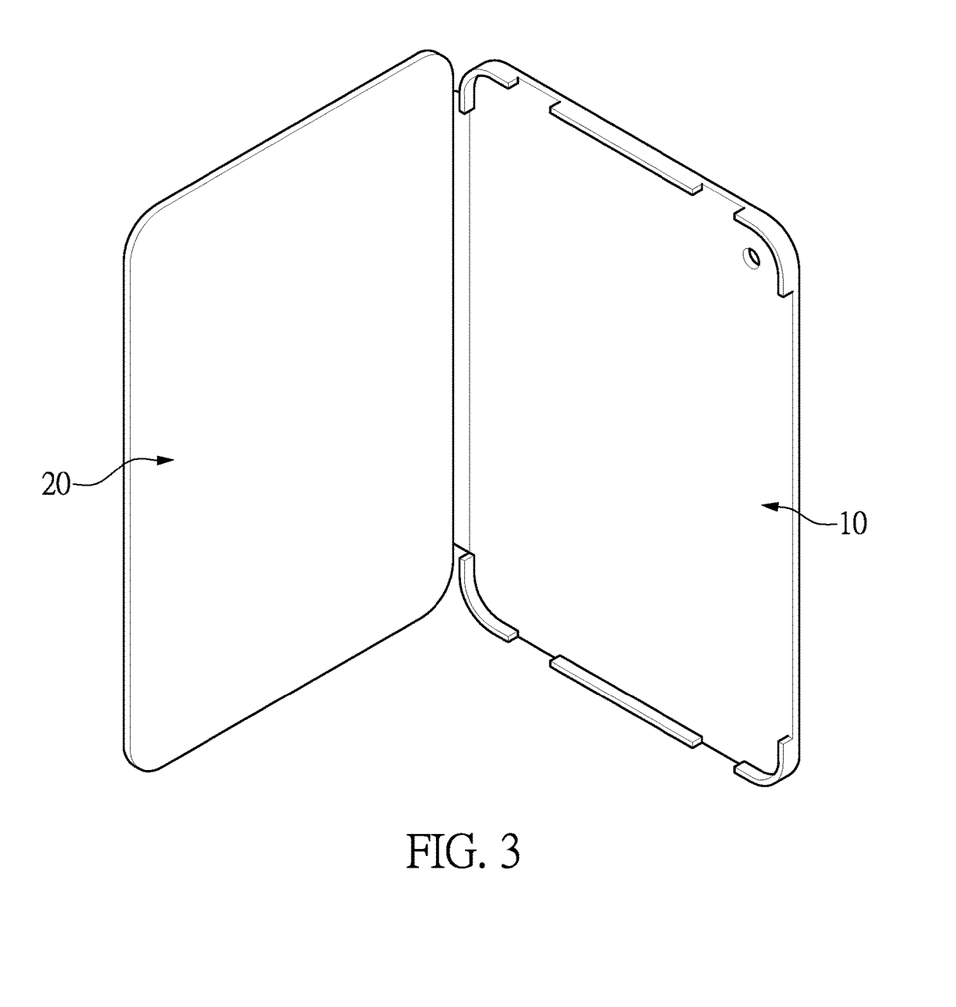
FIG. 3 is a perspective view (3) of the biodegradable protective device according to the present invention.

In another embodiment of the present invention as illustrated in FIG. 3, the biodegradable protective device can be adapted for a tablet computer and its protective portion 20 can be arranged in the manners as shown in any one of FIGS. 6, 7, and 8.

In another embodiment of the present invention as illustrated in FIG. 4, the biodegradable protective device can be adapted for a mobile phone and its protective portion 20 can be partially affixed to the outer surface of the main body 10 to partially cover the outer surface of the main body 10, and, of course, the outer surface of the main body 10 can be completely covered by the protective portion 20. The detailed structure of the protective portion 20 can be arranged as shown in any one of FIGS. 6, 7, and 8.

In addition, the biodegradable protective device may include the main body 10 made of biodegradable plastic in an amount of 34 to 58% of total weight of the biodegradable protective device, the protective portion 20 made of biodegradable material in an amount of 37 to 61% of total weight of the biodegradable protective device, and an adhesive used for bonding the protective portion 20 to the main body 10 in an amount of 2 to 5% of total weight of the biodegradable protective device. The total weight of the biodegradable protective device is 10 to 20 grams.

Moreover, the protective portion 20 is made of the biodegradable material that degrades at a faster rate as compared to the main body 10.

Another embodiment of the present invention illustrated in FIG. 5, the outer and inner surfaces of the main body 10 can be partially covered by the protective portion 20, and, of course, the outer and inner surfaces of the main body 10 can be completely covered by the protective portion 20. The detailed structure of the protective portion 20 can be arranged in the manners as shown in any one of FIGS. 6, 7, and 8.

It should be noted that the biodegradable protective device of the present invention can also be adapted for a notebook, so that the outer shapes of the main body 10 and the protective portion 20 can be appropriately changed in correspondence to the outer shape of the notebook. Therefore, the outer shapes of the main body 10 and the protective portion 20 are not limited to that disclosed herein and can be appropriately changed depending on the actual requirements.

In summary, the main body and the protective portion of the biodegradable protective device of the present invention, respectively, are biodegradable plastic and biodegradable material, thereby achieving biodegradation of the same after being disposed without causing environmental pollution and impact.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A biodegradable protective device, adapted for a mobile device, comprising:
    a main body made of biodegradable plastic; and
    a protective portion made of biodegradable material, the protective portion connected to the main body and used to protect the mobile device from damage;
    wherein the biodegradable protective device comprises the main body made of biodegradable plastic in an amount of 34 to 58% of total weight of the biodegradable protective device, the protective portion made of biodegradable material in an amount of 37 to 61% of total weight of the biodegradable protective device, and an adhesive used for bonding the protective portion to the main body in an amount of 2 to 5% of total weight of the biodegradable protective device.

2. The biodegradable protective device according to claim 1, wherein the protective portion is made of animal leather.

3. The biodegradable protective device according to claim 1, wherein the protective portion is made of vegetable/fruit leather.

4. The biodegradable protective device according to claim 1, wherein the protective portion is made of biodegradable fiber.

5. The biodegradable protective device according to claim 1, wherein the protective portion has a fabric layer and an inner layer stacked in sequence.

6. The biodegradable protective device according to claim 5, wherein the fabric layer is made of animal leather, the inner layer is made of biodegradable fiber.

7. The biodegradable protective device according to claim 5, wherein the fabric layer is made of vegetable/fruit leather, the inner layer is made of biodegradable fiber.

8. The biodegradable protective device according to claim 5, wherein the fabric layer is made of biodegradable fiber, the inner layer is made of biodegradable fiber.

9. The biodegradable protective device according to claim 1, wherein the protective portion has a fabric layer, a support layer and an inner layer stacked in sequence.

10. The biodegradable protective device according to claim 9, wherein the fabric layer is made of animal leather, the inner layer is made of biodegradable fiber.

11. The biodegradable protective device according to claim 9, wherein the fabric layer is made of vegetable/fruit leather, the inner layer is made of biodegradable fiber.

12. The biodegradable protective device according to claim 9, wherein the fabric layer is made of biodegradable fiber, the inner layer is made of biodegradable fiber.

13. The biodegradable protective device according to claim 9, wherein the support layer is made of biodegradable plastic.

* * * * *